US009917722B2

(12) United States Patent
Hong et al.

(10) Patent No.: US 9,917,722 B2
(45) Date of Patent: Mar. 13, 2018

(54) MODULATION METHOD AND APPARATUS FOR SIGNAL TRANSMISSION AND RECEPTION IN MOBILE COMMUNICATION SYSTEM

(71) Applicant: Samsung Electronics Co., Ltd., Suwon-si, Gyeonggi-do (KR)

(72) Inventors: Sungnam Hong, Anyang-si (KR); Min Sagong, Suwon-si (KR); Chiwoo Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/120,928

(22) PCT Filed: Feb. 13, 2015

(86) PCT No.: PCT/KR2015/001463
§ 371 (c)(1),
(2) Date: Aug. 23, 2016

(87) PCT Pub. No.: WO2015/130043
PCT Pub. Date: Sep. 3, 2015

(65) Prior Publication Data
US 2016/0366004 A1 Dec. 15, 2016

(30) Foreign Application Priority Data

Feb. 27, 2014 (KR) ........................ 10-2014-0023620

(51) Int. Cl.
*H04L 27/36* (2006.01)
*H03C 1/52* (2006.01)
(Continued)

(52) U.S. Cl.
CPC ........ *H04L 27/3411* (2013.01); *H04B 17/336* (2015.01); *H04L 25/03866* (2013.01); *H04L 27/106* (2013.01)

(58) Field of Classification Search
USPC ................ 375/219, 220, 221, 222, 211, 223, 375/240.26–240.27, 257, 258, 256, 261,
(Continued)

(56) References Cited

U.S. PATENT DOCUMENTS 8,526,546 B2 * 9/2013 Nakao .................. H04B 1/7075
375/340
2004/0141481 A1 7/2004 Lee et al.
(Continued)

FOREIGN PATENT DOCUMENTS

EP 1995904 A1 11/2008
KR 10-2014-0081751 A 7/2014
(Continued)

*Primary Examiner* — Linda Wong
(74) *Attorney, Agent, or Firm* — Jefferson IP Law, LLP

(57) ABSTRACT

A method and a transmission device of a mobile communication system are disclosed. The method includes determining a modulation method for data transmission, determining the level of a quadrature amplitude modulation (QAM) according to the determined modulation method, determining the amplitude of a carrier wave and the phase of the carrier wave on the basis of the determined QAM level and the data to be transmitted, and, when the determined modulation method is a first modulation method, determining a sequence length, selecting a sequence form among sequences having the determined length according to the data to be transmitted, and generating a symbol modulating the data to be transmitted, on the basis of the selected sequence, the determined amplitude of the carrier wave, and the determined phase of the carrier wave.

16 Claims, 15 Drawing Sheets

(51) Int. Cl.
*H03D 3/00* (2006.01)
*H04L 27/34* (2006.01)
*H04L 27/10* (2006.01)
*H04L 25/03* (2006.01)
*H04B 17/336* (2015.01)

(58) Field of Classification Search
USPC ....... 375/260, 268, 271, 279, 280, 283, 284, 375/295, 298, 300, 309, 316, 320, 322, 375/329, 340, 346, 348
See application file for complete search history.

(56) References Cited

U.S. PATENT DOCUMENTS

| | | | |
|---|---|---|---|
| 2005/0025221 A1 | 2/2005 | Lindsey et al. | |
| 2010/0046663 A1* | 2/2010 | Han | H04L 25/0226 375/295 |
| 2010/0067461 A1* | 3/2010 | Kwak | H04L 1/0026 370/329 |
| 2010/0208664 A1* | 8/2010 | Nishio | H04J 13/18 370/329 |
| 2011/0019697 A1* | 1/2011 | Seki | H04L 25/03343 370/480 |
| 2011/0134747 A1* | 6/2011 | Kwon | H04L 1/1607 370/208 |
| 2012/0045024 A1* | 2/2012 | Cui | H04L 1/005 375/341 |
| 2012/0093248 A1 | 4/2012 | Kwon et al. | |
| 2012/0120768 A1* | 5/2012 | Horsky | G01S 7/536 367/93 |
| 2012/0213176 A1* | 8/2012 | Kwak | H04L 1/0026 370/329 |
| 2013/0089168 A1* | 4/2013 | Nakao | H04B 1/7075 375/340 |
| 2013/0230123 A1* | 9/2013 | Noh | H04B 7/0452 375/295 |
| 2014/0177756 A1 | 6/2014 | Park et al. | |
| 2015/0358194 A1 | 12/2015 | Yu et al. | |

FOREIGN PATENT DOCUMENTS

| | | |
|---|---|---|
| KR | 10-2014-0081753 A | 7/2014 |
| WO | 2010-004586 A2 | 1/2010 |

* cited by examiner

MODULATION METHOD AND APPARATUS FOR SIGNAL TRANSMISSION AND RECEPTION IN MOBILE COMMUNICATION SYSTEM

CROSS-REFERENCE TO RELATED APPLICATION(S)

This application is a U.S. National Stage application under 35 U.S.C. § 371 of an International application filed on Feb. 13, 2015 and assigned application number PCT/KR2015/001463, which claimed the benefit of a Korean patent application filed on Feb. 27, 2014 in the Korean Intellectual Property Office and assigned Serial number 10-2014-0023620, the entire disclosure of which is hereby incorporated by reference

TECHNICAL FIELD

The present invention relates to a modulation method and apparatus for signal transmission and reception in a mobile communication system and, more particularly, to a modulation method and apparatus that cause interference signals to have a non-Gaussian distribution in a mobile communication system.

BACKGROUND ART

For low-complexity operation in a mobile communication system, it has been assumed that the interference signals have a Gaussian distribution. The complexity of implementing communication systems has been lowered by performing operations such as adaptive modulation, adaptive coding, and hard-decision decoding metric generation under this assumption.

In related art techniques, modulation schemes based on quadrature amplitude modulation (QAM) are mainly used to make the distribution of interference signals resemble a Gaussian distribution as much as possible. In this context, QAM symbols may be repeatedly sent to a user to achieve the target performance when a target error performance set for the user is not achieved even after application of the minimum channel coding rate and minimum modulation order.

Communication entities using existing modulation schemes, such as QAM, frequency-shift keying (FSK), and phase-shift keying (PSK), may transmit and receive information by differentiating sizes, frequencies or phases of symbols in the time or spatial domain of signals. When the channel gain is above a preset threshold, various interference levels are low, or a high transmit power is used, as the effective distance between symbols increases at the receiver side, it is possible to increase the data rate by using a high-order modulation scheme.

Meanwhile, in a cellular wireless communication network, there are downlink transmission from a base station to a user equipment and uplink transmission from a user equipment to a base station. Here, for a user equipment performing uplink transmission, the peak-to-average-power ratio (PAPR) is important since battery consumption is to be minimized. In the cellular mobile communication standard such as 3GPP LTE, single carrier frequency division multiple access (SC-FDMA) is applied in the uplink to reduce the PAPR. Hence, it is necessary to develop a modulation method and apparatus that do not cause the high PAPR problem during signal transmission and reception based on not only orthogonal frequency-division multiple access (OFDMA) but also SC-FDMA.

DISCLOSURE OF INVENTION

Technical Problem

Embodiments of the present invention have been made in view of the above problems. Accordingly, an aspect of the present invention is to provide a modulation method and apparatus wherein the additive noise distribution due to interference components arising from signal transmission and reception in a mobile communication system is non-Gaussian.

Another aspect of the present invention is to provide a modulation method and apparatus that can mitigate the high-PAPR problem during signal transmission and reception in a mobile communication system.

Solution to Problem

In accordance with an aspect of the present invention, there is provided a method of signal transmission for a transmitter device in a mobile communication system. The method may include: determining a modulation scheme for data transmission; determining the level for Quadrature Amplitude Modulation (QAM) according to the determined modulation scheme; determining the amplitude and phase of a carrier wave on the basis of the QAM level and data to be sent; and determining, when the determined modulation scheme is a first scheme, the length of sequences, selecting a sequence according to the data to be sent among sequences of the determined length, and generating symbols for modulating the data to be sent on the basis of the selected sequence, and the amplitude and phase of the carrier wave.

In accordance with another aspect of the present invention, there is provided a method of signal reception for a receiver device in a mobile communication system. The method may include: receiving a signal from a transmitter device; identifying the modulation scheme of the received signal; determining a sequence corresponding to the received signal from a sequence set used to modulate the received signal on the basis of the modulation scheme and a correlator associated with the sequence set; and demodulating the received signal on the basis of the determined sequence and the log likelihood ratio (LLR) corresponding to the received signal.

In accordance with another aspect of the present invention, there is provided a transmitter device in a mobile communication system. The transmitter device may include: a transceiver unit to transmit and receive signals; and a control unit to perform a process of controlling the transceiver unit, determining a modulation scheme for data transmission, determining the level for quadrature amplitude modulation (QAM) according to the determined modulation scheme, determining the amplitude and phase of a carrier wave on the basis of the QAM level and data to be sent, and determining, when the determined modulation scheme is a first scheme, the length of sequences, selecting a sequence according to the data to be sent among sequences of the determined length, and generating symbols for modulating the data to be sent on the basis of the selected sequence, and the amplitude and phase of the carrier wave.

In accordance with another aspect of the present invention, there is provided a receiver device in a mobile communication system. The receiver device may include: a transceiver unit to transmit and receive signals; and a control unit to perform a process of controlling the transceiver unit to receive a signal from a transmitter device, identifying the modulation scheme of the received signal, determining a sequence corresponding to the received signal from a sequence set used to modulate the received signal on the basis of the modulation scheme and a correlator associated with the sequence set, and demodulating the received signal on the basis of the determined sequence and the log likelihood ratio (LLR) corresponding to the received signal.

Advantageous Effects of Invention

In a feature of the present invention, there is provided a modulation method that causes the additive noise distribution to be non-Gaussian in a mobile communication system. Hence, it is possible to significantly increase system throughput. In addition, there are provided a modulation method and apparatus that avoid the high-PAPR problem during signal transmission and reception based on SC-FDMA.

MODE FOR THE INVENTION

Figure 1:
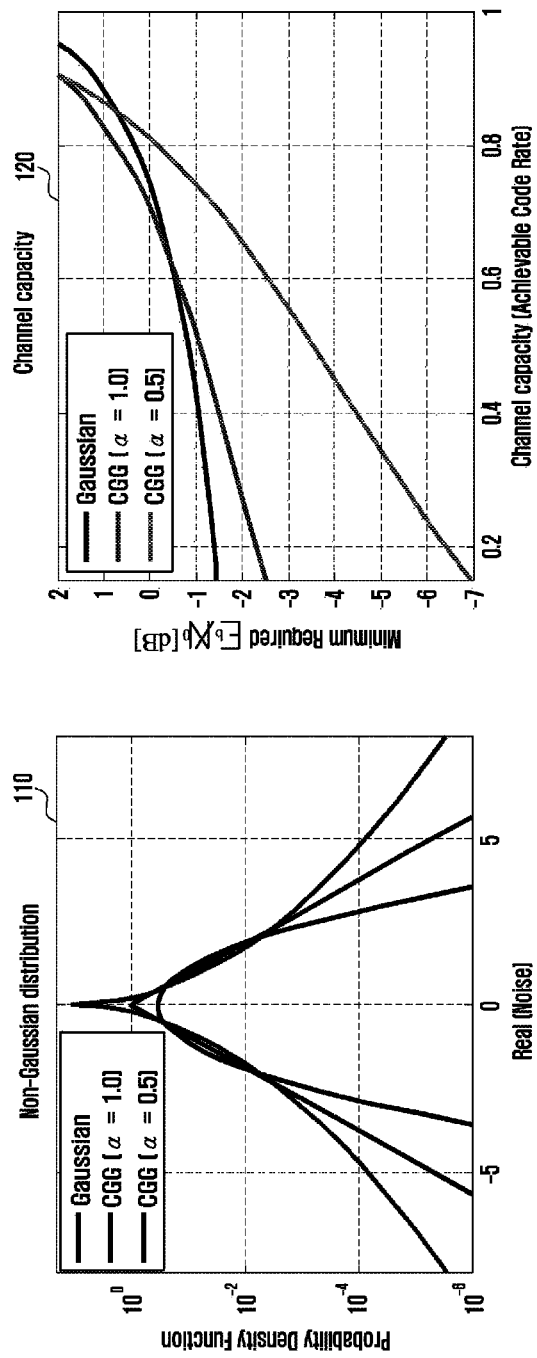
FIG. 1 illustrates variations in channel capacity for different additive noise distributions.

Hereinafter, embodiments of the present invention are described in detail with reference to the accompanying drawings.

Descriptions of well-known functions and structures incorporated herein may be omitted to avoid obscuring the subject matter of the present invention. Descriptions of components having substantially the same configurations and functions may also be omitted.

In the drawings, some elements are exaggerated, omitted, or only outlined in brief, and thus may be not drawn to scale. The same or similar reference symbols are used throughout the drawings to refer to the same or like parts.

The aspects, features and advantages of certain embodiments of the present invention will be more apparent from the following detailed description taken in conjunction with the accompanying drawings. The description of the various embodiments is to be construed as exemplary only and does not describe every possible instance of the present invention. It should be apparent to those skilled in the art that the following description of various embodiments of the present invention is provided for illustration purpose only and not for the purpose of limiting the present invention as defined by the appended claims and their equivalents. The same reference symbols are used throughout the description to refer to the same parts.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module" or the like may refer to a software component or hardware component such as an FPGA or ASIC capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units. Components and units may be configured to drive a device or one or more processors in a secure multimedia card.

FIG. 1 illustrates variations in channel capacity for different additive noise distributions.

Reference numeral 110 shows cases where the additive noise distribution is Gaussian, complex generalized Gaussian with $\alpha=1.0$, and complex generalized Gaussian with $\alpha=0.5$. Reference numeral 120 shows the minimum signal-to-noise ratio required to achieve a specific channel capacity for each case.

It can be seen from FIG. 1 that the channel capacity is relatively low when the additive noise distribution is Gaussian in an environment where the interference signal strength is high, in comparison to other cases. It can also be seen that the channel capacity is high when the additive noise distribution is a non-Gaussian distribution with a heavy tail.

As described above, in a wireless communication network, the channel capacity may be lower when the additive noise statistically follows a Gaussian distribution in comparison to when the additive noise follows a different distribution. Hence, when the transmission and reception system is designed so that the statistical distribution of interference signals becomes a non-Gaussian distribution, it is possible to raise the network throughput via the increased channel capacity.

In the event that the transmitter side of a communication system transmits a signal by use of quadrature phase shift keying (QPSK) modulation with a given channel coding rate, when a target error performance is not met, it may be possible to achieve the target error performance by repeatedly transmitting the same modulation symbols. However, signal transmission using the above modulation approach may cause the additive noise to follow a Gaussian distribution. This may reduce the channel capacity.

Figure 2:
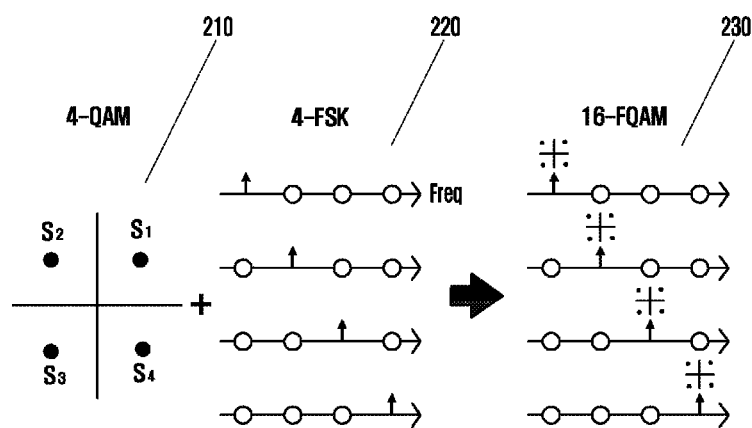
FIG. 2 illustrates frequency and quadrature amplitude modulation (FQAM) according to an embodiment of the present invention.

FIG. 2 illustrates frequency and quadrature amplitude modulation (FQAM) according to an embodiment of the present invention.

The modulation scheme shown in FIG. 2 is a combination of 4-FSK (frequency shift keying) and 4-QAM (quadrature amplitude modulation). In FQAM, information contained in a signal may be represented on the basis of frequency, phase, and amplitude. More specifically, information contained in a signal may be represented on the basis of at least one of the frequency, phase, and amplitude of a carrier wave. FIG. 2 illustrates a combination of 4-QAM and 4-FSK. However, modulation schemes of different rates may be combined into a new modulation scheme.

Reference numeral 210 indicates a constellation diagram of QAM with a level of 4. In signal transmission using 4-QAM, it is possible to transmit four different pieces of information per FSK symbol.

Reference numeral 220 indicates a constellation diagram of FSK with a level of 4. It is possible to transmit four different pieces of information per QAM symbol by activating symbols with different frequencies using 4-FSK.

In FQAM being a combination of the schemes 210 and 220, there may be 16 different transmission symbol candidates.

When a FQAM-modulated signals is sent, the additive noise on the channel may have a non-Gaussian distribution. In this case, the channel capacity can be higher when FQAM modulation is used for signal transmission in comparison to when QAM modulation is used.

Figure 3:
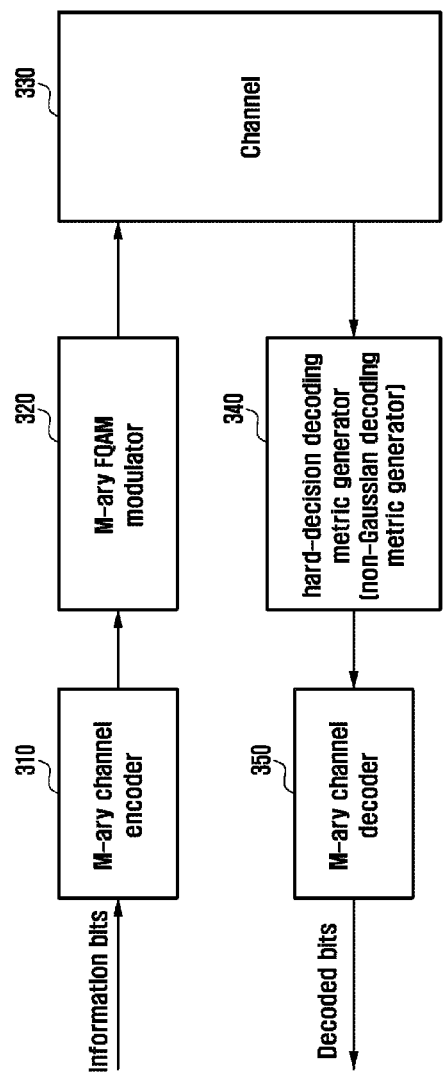
FIG. 3 illustrates transmitter-side elements and receiver-side elements for FQAM according to an embodiment of the present invention.

FIG. 3 illustrates transmitter-side elements and receiver-side elements for FQAM according to an embodiment of the present invention.

Referring to FIG. 3, the transmitter may include an M-ary channel encoder 310 and an M-ary FQAM modulator 320. Information bits to be sent may be input to the M-ary channel encoder 310. The M-ary channel encoder 310 may encode input information bits into M-ary symbols. Here, M may be variable and have different values according to designs.

The M-ary FQAM modulator 320 may modulate encoded M-ary symbols into M-ary FQAM symbols. The M-ary FQAM modulator 320 may perform modulation on the basis of the frequency, phase, and amplitude of the signal to be sent. Here, M may be varied according to embodiments, and the levels of QAM and FSK may also be varied.

The signal modulated by the M-ary FQAM modulator 320 may be sent to the receiver-side through the channel 330.

The receiver may include a hard-decision decoding metric generator 340 and an M-ary channel decoder 350.

The hard-decision decoding metric generator 340 may be a non-Gaussian decoder, and may decode a received signal by use of hard decision. The hard-decision decoding metric generator 340 may also generate a non-binary decoding metric.

The M-ary channel decoder 350 may perform decoding on the basis of the decoding metric generated by the hard-decision decoding metric generator 340. The bits decoded by the M-ary channel decoder 350 may be forwarded to the control unit of the receiver.

The above transmitter and receiver may perform signal transmission and reception in such a manner that the additive noise distribution becomes non-Gaussian.

Figure 4:
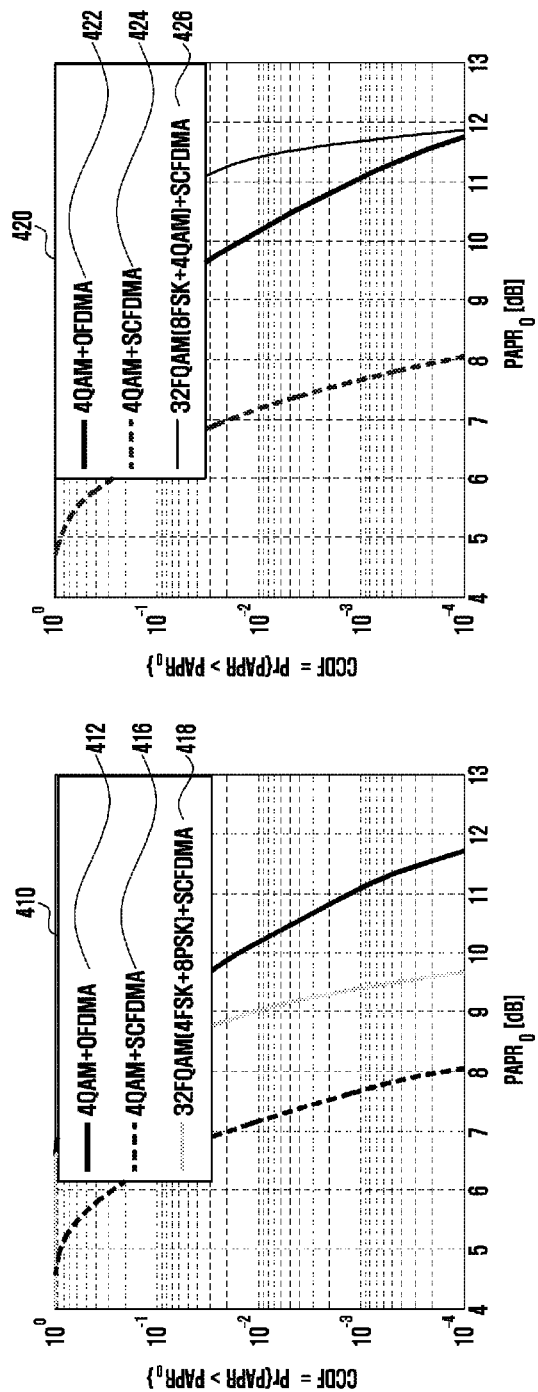
FIG. 4 illustrates PAPR distributions for different modulation schemes according to an embodiment of the present invention.

FIG. 4 illustrates PAPR distributions for different modulation schemes according to an embodiment of the present invention.

In FIG. 4, reference numerals 410 and 420 indicate PAPR distributions for different modulation schemes used in orthogonal frequency division multiple access (OFDMA) and single-carrier frequency division multiple access (SC-FDMA) systems.

Reference numerals 412 and 422 indicate the PAPR when the transmitted signal is 4-QAM modulated in the OFDMA system.

Reference numerals 416 and 424 indicate the PAPR when the transmitted signal is 4-QAM modulated in the SC-FDMA system.

Reference numeral 418 indicates the PAPR when the transmitted signal is modulated by 32-FQAM (combination of 4-FSK and 8-PSK) in the SC-FDMA system.

Reference numeral 426 indicates the PAPR when the transmitted signal is modulated by 32-FQAM (combination of 8-FSK and 4-PSK) in the SC-FDMA system.

As can be seen in FIG. 4, in the SC-FDMA system, the PAPR is higher for FQAM compared to QAM.

In the case of FQAM, only some of many subcarriers constituting symbols are activated, causing the interference signals to statistically follow a non-Gaussian distribution. This is similar to the case of FSK modulation. However, FQAM modulation transmitting QAM symbols through the activated subcarriers may significantly enhance the spectral efficiency in comparison to FSK modulation. When FQAM modulation is applied to users in the cell edge region where strong interference signals are present, as a non-Gaussian interference channel is created, it is possible to significantly enhance the network throughput in comparison to an existing system that repeatedly transmits QAM symbols to create a Gaussian interference channel.

Meanwhile, in a cellular wireless communication network, there are downlink transmission from a base station to a user equipment and uplink transmission from a user equipment to a base station. Here, for a user equipment performing uplink transmission to a base station, the peak-to-average-power ratio (PAPR) is important since battery consumption is to be minimized. Hence, in the cellular mobile communication standard such as 3GPP LTE, single carrier frequency division multiple access (SC-FDMA) is applied in the uplink to reduce the PAPR.

In the OFDMA system, the PAPR of FQAM modulation is similar to that of QAM modulation. However, in the SC-FDMA system, the PAPR of FQAM modulation is much higher than that of QAM modulation. This is because only some of many subcarriers constituting symbols are activated in FQAM modulation.

In the event that FQAM modulation instead of QAM modulation is applied to the SC-FDMA system, although a non-Gaussian interference channel may be created, as the transmit power is to be lowered compared to QAM because of the high-PAPR problem, the overall network throughput may be significantly degraded. Accordingly, it is necessary to develop a modulation scheme that can create a non-Gaussian interference channel without causing the high-PAPR problem in the SC-FDMA system.

Figure 5:
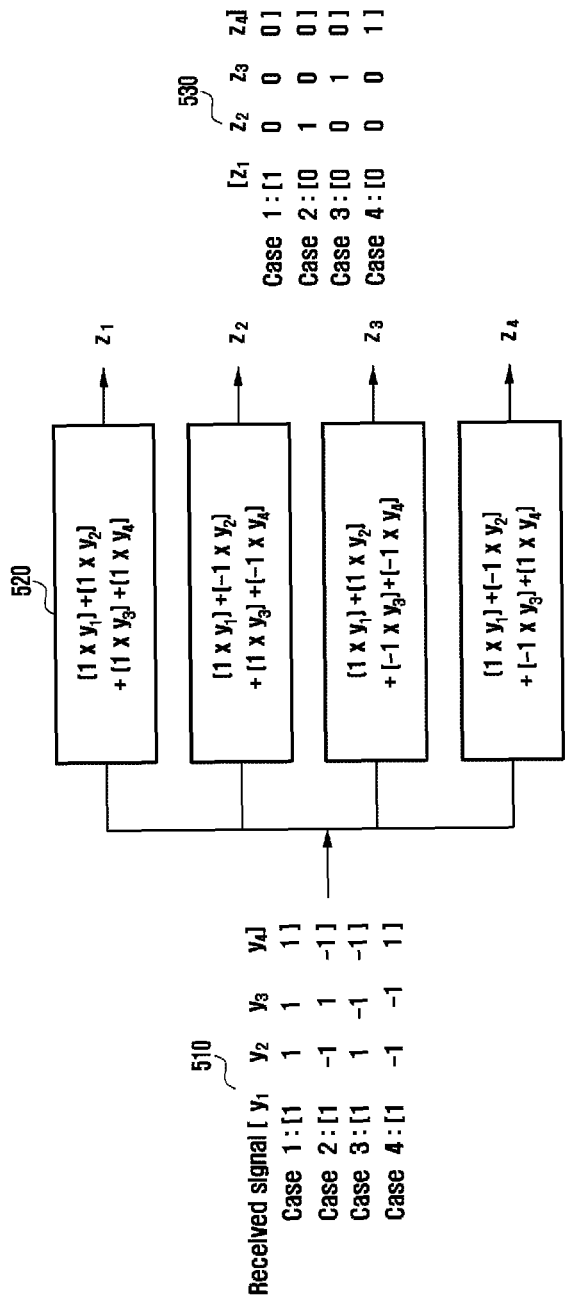
FIG. 5 illustrates sequence modulation and decoding according to an embodiment of the present invention.

FIG. 5 illustrates sequence modulation and decoding according to an embodiment of the present invention.

Referring to FIG. 5, the correlator 520 may process a received signal 510 componentwisely into an output signal 530.

The received signal 510 includes specific sequences to which input bit strings have been respectively mapped by the transmitter. Each input bit string is two bits long and may be mapped to a Walsh sequence of length 4. The length of input bit strings and the length of Walsh sequences may be varied according to embodiments. In addition to such a Walsh sequence set, it is possible to use a different sequence set whose sequences are distinguishable, whose sequences are pairwise orthogonal, or whose sequences are not pairwise correlated. In a certain embodiment, it is possible to use a different sequence set whose sequences are not pairwise orthogonal but have near-zero pairwise correlation.

The modulator at the transmitter side may map input bit strings to sequences of an orthogonal sequence set. For example, referring to FIG. 5, input bit strings "00", "01", "10" and "11" may be mapped respectively to case 1, case 2, case 3 and case 4. This mapping may be varied according to embodiments, and may be determined dynamically according to signal types and timings on the basis of configuration settings between the transmitter and receiver sides.

The correlator 520 may compute the output signal 530 on the basis of components of the received signal. The computational expression of the correlator 520 may be varied according to the type and length of sequences used by the modulator.

The control unit of the receiver may determine the input bit strings having been mapped on the basis of the output signal 530. This mapping may be pre-configured between the transmitter and the receiver or may be determined according to a specific signal sent by the transmitter or the receiver.

As described above, it is possible to transmit information contained in input bit strings from the transmitter to the receiver through modulation based on specific sequences.

Figure 6:
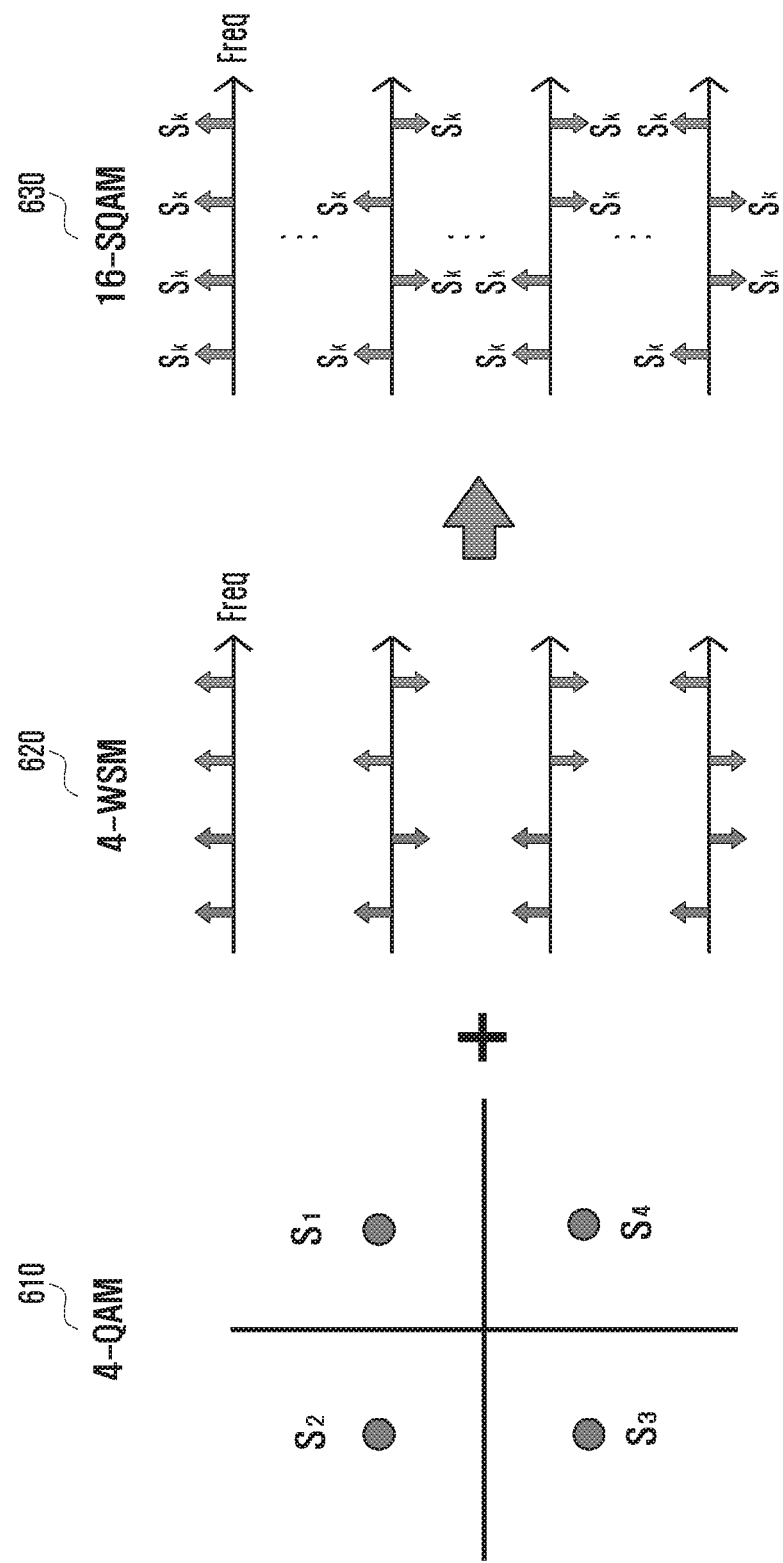
FIG. 6 illustrates sequence quadrature amplitude modulation (SQAM) according to an embodiment of the present invention.

FIG. 6 illustrates sequence quadrature amplitude modulation (SQAM) according to an embodiment of the present invention.

Referring to FIG. 6, it is possible to modulate a signal by use of SQAM being a combination of 4-QAM and 4-WSM (Walsh sequence modulation). In SQAM modulation, information contained in a signal may be represented in terms of sequence type, signal phase, and signal amplitude. More specifically, it is possible to represent information contained in a signal on the basis of at least one of the selected sequence, the phase of a carrier, and the amplitude of a carrier.

FIG. 6 illustrates a combination of 4-QAM and 4-WSM. However, SQAM modulation may be obtained by combining modulation schemes of different rates.

Reference numeral 610 indicates a constellation diagram of QAM with a level of 4. In signal transmission using 4-QAM, it is possible to transmit four different pieces of information per WSM symbol.

Reference numeral 620 indicates a constellation diagram of WSM with a level of 4. The phase of a subcarrier in each frequency band may be varied according to the selected sequence.

In SQAM being a combination of the schemes 610 and 620, there may be 16 different transmission symbol candidates.

Reference numeral 630 indicates a constellation diagram of 16-SQAM. Here, $S_k$ denotes one of 4-QAM symbol candidates.

As described above, SQAM modulation may be achieved by combining QAM and WSM. In a SQAM-modulated signal, all subcarriers are activated similarly to the case of QAM. Hence, when SQAM is applied to the SC-FDMA system, the high-PAPR problem may be less serious in comparison to FQAM. When SQAM modulation is used to modulate transmission data, the additive noise can be made to follow a non-Gaussian distribution and the high-PAPR problem may not arise even in the SC-FDMA system.

Figure 7:
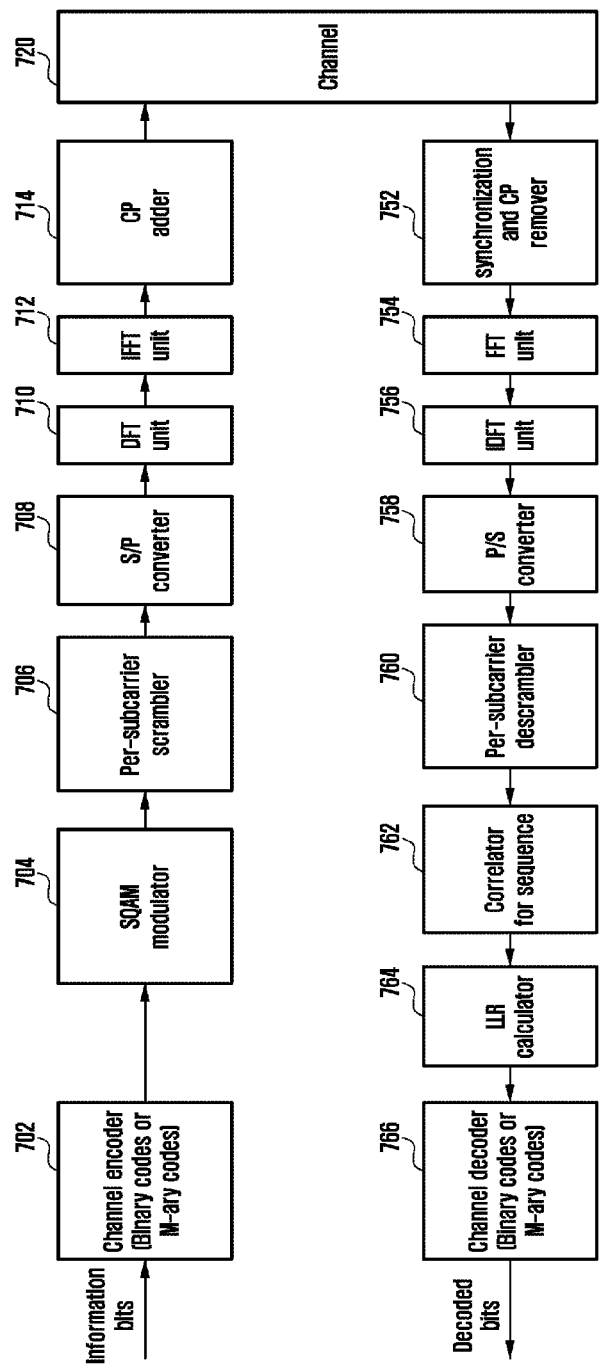
FIG. 7 illustrates transmitter-side elements and receiver-side elements according to an embodiment of the present invention.

FIG. 7 illustrates transmitter-side elements and receiver-side elements according to an embodiment of the present invention.

Referring to FIG. 7, the transmitter may include at least one of a channel encoder 702, a SQAM modulator 704, a scrambler 706, a serial-to-parallel converter 708, a DFT (discrete Fourier transform) unit 710, an IFFT (inverse fast Fourier transform) unit 712, and a CP (cyclic prefix) adder 714. One or more of the above elements may be optional and may be omitted according to embodiments.

The channel encoder 702 may encode information bits to be sent using binary codes or M-ary codes.

The SQAM modulator 704 may modulate the coded information bits using SQAM modulation. The level of SQAM modulation may be varied according to embodiments, and may be determined in consideration of channel conditions.

The scrambler 706 may scramble the modulated signal. Here, scrambling may be performed on a subcarrier basis. Specifically, to decrease the PAPR, scrambling may be performed on a subcarrier basis so that repeated patterns are reduced between subcarriers. The scrambling sequence may be selected differently according to the signal to be sent. However, it is preferable to apply the same scrambling sequence for the same transmitter-receiver pair.

The S/P converter 708 splits the scrambled signal into a group of parallel bit streams. The DFT unit 710 may apply discrete Fourier transform. The IFFT unit 712 may apply inverse fast Fourier transform. The CP adder 714 may add a CP to the processed signal, which may be sent to the receiver through the channel 720.

The receiver may include at least one of a synchronization and CP remover 752, an FFT unit 754, an IDFT unit 756, a P/S converter 758, a descrambler 760, a correlator 762, an LLR (log likelihood ratio) calculator 764, and a channel decoder 766.

The synchronization and CP remover 752 may perform synchronization and remove a CP from the received signal. The FFT unit 754 may apply fast Fourier transform to the signal without a CP. The IDFT unit 756 may apply inverse discrete Fourier transform to the transformed signal. The P/S converter 758 may combine parallel bit streams into a serial bit stream.

The descrambler 760 may descramble the signal using a sequence corresponding to that of the scrambler 706. Preferably, descrambling may be performed on a subcarrier basis in a manner matching that of the scrambler 706.

The correlator 762 may obtain information on the sequence used by the SQAM modulator 704 to extract information contained in the received signal. The correlator 762 may identify information on the sequence and mapping used by the SQAM modulator 704 to extract information on the sequence used by the SQAM modulator 704 from the received signal.

The LLR calculator 764 may calculate the log likelihood ratio on the basis of the received signal.

The channel decoder 766 may estimate symbols on the basis of the calculated LLR value and received signal.

More specifically, the channel decoder 766 may estimate at least one of information bits and symbols on the basis of the calculated LLR value. A binary decoder being an instance of the channel decoder may calculate the LLR according to Equation 1.

$$L_{k,\lambda}^{BICM}(\hat{H}[k], y[k]) = \ln \frac{\sum_{w \in A_0^\lambda} f_{Y[k]}(y[k] | \hat{H}[k], s[k] = w)}{\sum_{w \in A_1^\lambda} f_{Y[k]}(y[k] | \hat{H}[k], s[k] = w)} \quad \text{Equation 1}$$

In Equation 1, $L_{k,\lambda}^{BICM}$ indicates the LLR of the λ-th bit in the k-th symbol for binary decoding, $\hat{H}[k]$ indicates the estimate of the channel coefficient for the k-th transmitted symbol, y[k] indicates the received signal corresponding to the k-th transmitted symbol, $A_0^\lambda$ indicates the set of candidate symbols whose λ-th bit is 0, $A_1^\lambda$ indicates the set of candidate symbols whose λ-th bit is 1, $f_y[k]$ indicates the probability density function (PDF) of the k-th received symbol, s[k] indicates the k-th transmitted symbol, and w is a dummy variable indicating a transmittable symbol candidate.

In the case of 16-QAM, $A_0^\lambda$ contains 8 symbols among 16 symbols in total, and $A_1^\lambda$ contains the other 8 symbols.

On the other hand, a non-binary decoder may compute the LLR according to Equation 2 and use the computation result as input.

$$L_k^{CM}(y[k], \hat{H}[k]) = (L_0 L_1 \ldots L_{M-1}) \text{ where}$$
$$L_1 = \ln(f_{Y[k]}(y[k] | \hat{H}[k], s[k] = x_1)) \quad \text{Equation 2}$$

In Equation 2, $L_k^{CM}$ indicates the LLR of the k-th symbol, y[k] indicates the received signal corresponding to the k-th transmitted symbol, $\hat{H}[k]$ indicates the estimate of the channel coefficient for the k-th transmitted symbol, $L_l$ indicates the LLR for the l-th candidate symbol, $f_{Y[k]}()$ indicates the PDF of the k-th received symbol, s[k] indicates the k-th transmitted symbol, $x_l$ and indicates the l-th candidate symbol.

As can be seen from Equation 2, LLR computation needed for channel decoding requires computation of the probability density function (PDF).

Among existing non-Gaussian decoding metrics, a representative one is the complex generalized Gaussian (CGG) decoding metric. In a scheme generating a CGG decoding metric, LLR or PDF computation is performed by assuming that interference signals or noise follow a CGG distribution and the computation result is fed as input to the channel decoder. As the scheme generating a CGG decoding metric covers a scheme generating a Gaussian decoding metric, only CGG decoding metric generation is described herein. The PDF of a CGG distribution may be given by Equation 3.

$$f_{\hat{Z}}(z | \alpha, \beta) = \frac{\alpha}{2\pi\beta^2 \Gamma\left(\frac{2}{\alpha}\right)} \exp\left(-\left(\frac{|z|}{\beta}\right)^\alpha\right) \quad \text{Equation 3}$$

In Equation 3, $f_{\hat{z}}$ indicates the PDF of noise, z is a variable denoting noise, α is a shape parameter indicating the degree of non-Gaussianity, β is a scale parameter representing the variance, and Γ indicates a gamma function defined as $\Gamma(z) \triangleq \int_0^\infty t^{z-1} \exp(-t) dt$.

Referring to Equation 3, the PDF of the CGG distribution follows a Gaussian distribution when α is equal to 2, follows a super-Gaussian distribution with a heavy tail when α is less than 2, and follows a sub-Gaussian distribution with a light tail when α is greater than 2. That is, when α is equal to 2, CGG decoding is the same as Gaussian decoding.

In most cases, interference signals and noises can be modeled by super-Gaussian or Gaussian distributions with α ranging from 0 to 2. β known as a scale parameter serves as the variance of a Gaussian PDF. Most PDFs used for non-Gaussian decoding include shape and scale parameters like α and β of a CGG distribution.

In one embodiment, for CGG decoding in QAM modulation, it is necessary to compute the PDF given by Equation 4.

$$f_{Y[k]}(y[k] | \hat{H}[k], s[k]) = \quad \text{Equation 4}$$
$$\frac{\alpha}{2\pi\beta^2 \Gamma(2/\alpha)} \exp\left(-\left(\frac{|y[k] - \hat{H}[k]s[k]|}{\beta}\right)^\alpha\right)$$

In Equation 4, $f_{Y[k]}()$ indicates the PDF of transmitted symbols, y[k] indicates the received signal corresponding to the k-th transmitted symbol, $\hat{H}[k]$ indicates the channel coefficient for the k-th transmitted symbol, s[k] indicates the k-th transmitted symbol, α is the shape parameter, β is the scale parameter, and Γ indicates a gamma function defined as $\Gamma(z) \triangleq \int_0^\infty t^{z-1} \exp(-t) dt$.

In the case of SQAM modulation, unlike QAM modulation, the receiver includes a correlator for a candidate sequence and there are multiple correlator outputs for one symbol. Hence, it may be not adequate to extend the LLR computation scheme proposed for QAM modulation to SQAM modulation. Accordingly, the LLR for SQAM can be computed using the PDF for Gaussian or non-Gaussian symbols as shown below in Equation 5 and Equation 6.

$$f_{Y[k]}(y[k] | \hat{H}[k], m[k], s[k]) = \quad \text{Equation 5}$$
$$\prod_{l=0}^{M_F-1} f_{Y_l[k]}(y_l[k] | \hat{H}[k], m[k], s[k])$$

In Equation 5, $f_{Y[k]}(\ )$ indicates the joint PDF of correlator outputs for a received symbol, y[k] indicates the correlator output vector corresponding to the k-th transmitted symbol, $\hat{H}[k]$ indicates the estimate of the channel coefficient for the k-th transmitted symbol, m[k] indicates the index to a sequence carrying QAM symbols in the k-th SQAM block, s[k] indicates the QAM symbol of the k-th transmitted symbol, $M_F$ indicates the number of candidate sequences used in SQAM modulation, $f_{Y_l[k]}(\ )$ indicates the PDF for the l-th correlator output, and $y_l[k]$ indicates the l-th correlator output for a received signal corresponding to the k-th transmitted symbol.

$$f_{Y_l[k]}(y_l[k] | \hat{H}[k], m[k], s[k]) = \frac{\alpha}{2\pi\beta^2 \Gamma(2/\alpha)} \exp\left(-\left(\frac{|y_l[k] - \hat{H}[k]s[k]\delta_{l,m[k]}|}{\beta}\right)^\alpha\right)$$

Equation 6

In Equation 6, $f_{Y_l[k]}(\ )$ indicates the PDF of the l-th correlator output for a received signal corresponding to the k-th transmitted symbol, $y_l[k]$ indicates the l-th correlator output for a received signal corresponding to the k-th transmitted symbol, $\hat{H}[k]$ indicates the estimate of the channel coefficient for the k-th transmitted symbol, m[k] indicates the index to a sequence carrying QAM symbols in the k-th SQAM block, s[k] indicates the QAM symbol of the k-th transmitted symbol, $\alpha$ is the shape parameter, $\beta$ is the scale parameter, and $\Gamma$ indicates a gamma function, and $\delta_{l,m[k]}$ indicates a delta function. Here, the gamma function is defined as $\Gamma(z) \triangleq \int_0^\infty t^{z-1} \exp(-t)dt$, and the delta function produces 1 if l=m[k] and produces 0 otherwise.

Next, a description is given of a procedure to estimate the parameter $\alpha$ representing non-Gaussianity of interference signals. That is, the parameter $\alpha$ represents the difference between the non-Gaussian distribution and the Gaussian distribution for interference signals. As described before, the distribution of interference signals is similar to the CGG distribution. Hence, the shape parameter $\alpha$ of the CGG PDF may be used as a measure for non-Gaussianity.

The user equipment uses the receiver to receive a signal for channel estimation from the base station, and collects a received signal for $M_F$ subcarriers constituting each SQAM symbol and estimated channel coefficients from FFT outputs of the receiver. The correlator output of a received signal for subcarriers constituting one SQAM symbol may be given by Equation 7.

$$Y[k] = (Y_1[k] Y_2[k] \ldots Y_{M_F}[k])$$

Equation 7

Here, $Y_l[k]$ indicates the l-th correlator output for the k-th received SQAM symbol.

Next, the user equipment may make a hard decision on the received signal on the basis of Equation 7 to estimate the transmitted SQAM symbols as shown in Equation 8.

$$(\hat{m}[k], \hat{s}[k]) = \arg\min_{\{m_j[k], s_j[k]\} \in C} \sum_{l=1}^{M_F} |Y_l[k] - \hat{H}[k]s_i[k]\delta_{m_j[k],l}|^2$$

Equation 8

Here, $\hat{m}[k]$ indicates the index to a SQAM sequence estimated through a hard decision on the k-th received SQAM symbol, $\hat{s}[k]$ indicates a transmitted QAM symbol of SQAM estimated through a hard decision on the k-th received SQAM symbol, and C indicates the set of available SQAM symbols and is represented by the index to a sequence of a SQAM symbol $m_j[k]$ and the QAM symbol transmitted using the sequence $s_i[k]$.

Thereafter, the hard-decision result from Equation 8 may be used to estimate the interference signals as shown in Equation 9.

$$J[k] = (J_1[k] J_2[k] \ldots J_{M_F}[k])$$

$$J_l[k] = Y_l[k] - \hat{H}[k]\hat{s}[k]\delta_{\hat{m}[k],l}$$

Equation 9

Here, $Y_l[k]$ indicates the l-th correlator output among $M_F$ correlator outputs for the k-th received SQAM symbol, $\hat{H}[k]$ indicates the average of estimates of channel coefficients for $M_F$ subcarriers constituting the k-th received SQAM symbol, $\hat{s}[k]$ indicates a transmitted QAM symbol of SQAM estimated through a hard decision on the k-th received SQAM symbol, $\hat{m}[k]$ indicates the index to a transmitted SQAM sequence estimated through a hard decision on the k-th received SQAM symbol, and $\delta_{l,\hat{m}[k]}$ indicates a delta function.

Finally, $\alpha$ indicating non-Gaussianity of interference signals may be estimated using Equation 10.

$$\alpha = \frac{\ln(3^6/2^{10})}{\ln\left(\frac{(E[|J_l[k]|])^2}{E[|J_l[k]|^2]} - \frac{\pi}{4} + \frac{9}{2^{3.5}}\right) + \ln\left(\frac{3}{2\sqrt{2}}\right)}$$

[Equation 10]

$$E\{|J_l[k]|^2\} \approx \frac{1}{N_S M_F} \sum_{k=1}^{N_S} \sum_{l=1}^{M_F} J_l[k]$$

$$E\{|J_l[k]|\} \approx \frac{1}{N_S M_F} \sum_{k=1}^{N_S} \sum_{l=1}^{M_F} \sqrt{J_l[k]}$$

Here, $N_s$ may indicate the number of received SQAM symbols used for $\alpha$ estimation. However, it is not necessarily interpret $N_s$ as such. $N_s$ may be interpreted as a parameter determined based on the number of symbols in the received signal with a value greater than 1 and less than the number of symbols in the received signal.

Meanwhile, the scale parameter $\beta$ of the CGG PDF may be estimated from the estimated $\alpha$ value as shown in Equation 11.

$$\beta = \frac{\Gamma(2/\alpha)}{\Gamma(3/\alpha)} E[|J_l[k]|]$$

Equation 11

In one embodiment, every element may perform its operation under the control of a control unit. The transmitter may include a transmission unit to transmit a signal, and the receiver may include a reception unit to receive the signal.

Figure 8:
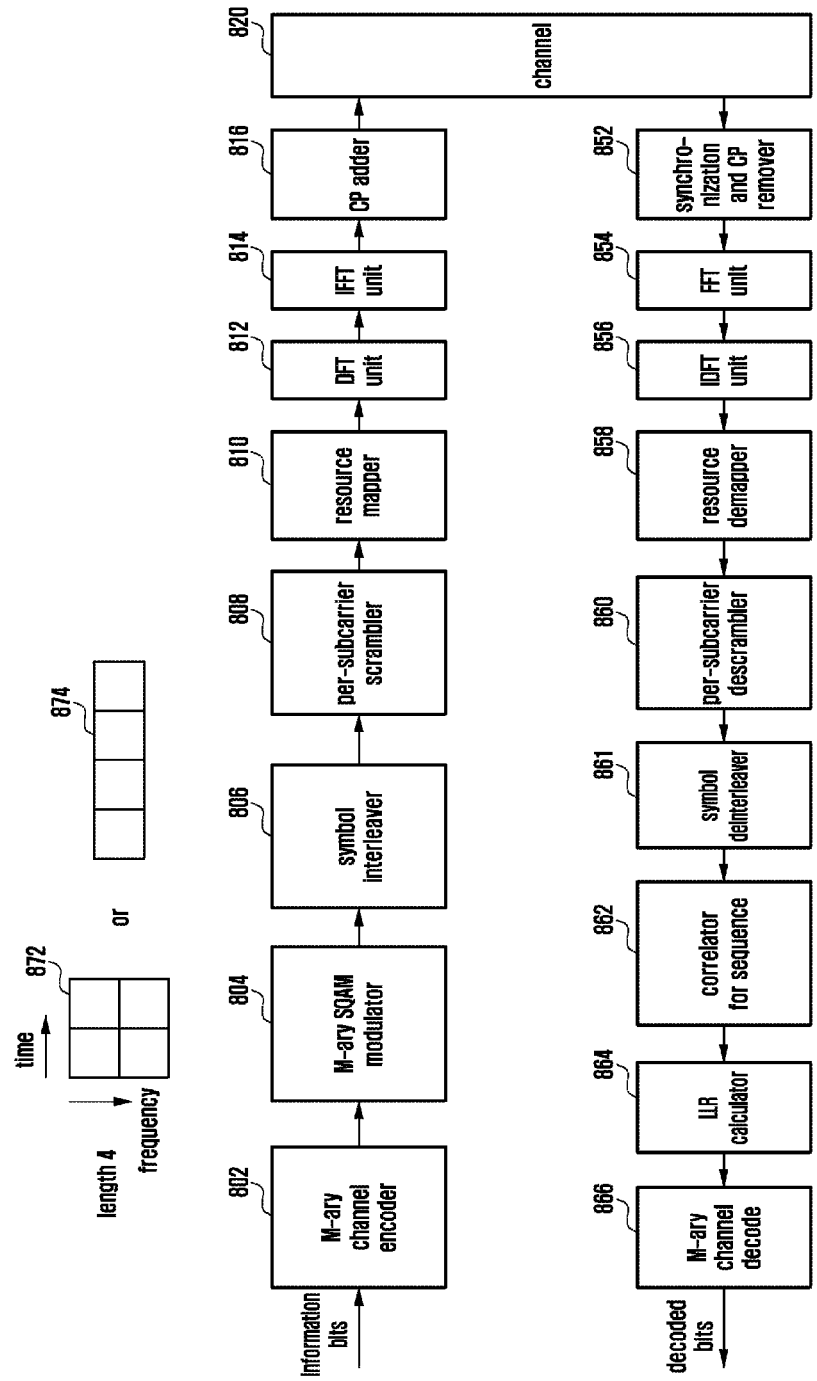
FIG. 8 illustrates transmitter-side elements and receiver-side elements according to another embodiment of the present invention.

FIG. 8 illustrates transmitter-side elements and receiver-side elements according to another embodiment of the present invention.

Referring to FIG. 8, the transmitter may include at least one of an M-ary channel encoder 802, an M-ary SQAM modulator 804, a symbol interleaver 806, a scrambler 808, a resource mapper 810, a DFT unit 812, an IFFT unit 814, and a CP adder 816. One or more of the above elements may be optional and may be omitted according to embodiments.

The M-ary channel encoder 802 may encode information bits to be sent using M-ary codes. As SQAM may have a distribution similar to that of FQAM with respect to the correlator output, it is possible to carry out channel encoding by use of M-ary codes. The value of M may be selected differently according to embodiments.

The M-ary SQAM modulator 804 may modulate the coded information bits using SQAM modulation. The level of SQAM modulation may be varied according to embodiments, and may be determined in consideration of channel conditions.

The symbol interleaver 806 may perform symbol interleaving to reduce channel correlation between SQAM symbols. Symbol interleaving may be performed on a SQAM symbol basis.

The scrambler 808 may scramble the modulated signal. Here, scrambling may be performed on a subcarrier basis. Specifically, to decrease the PAPR, scrambling may be performed on a subcarrier basis so that repeated patterns are reduced between subcarriers. The scrambling sequence may be selected differently according to the signal to be sent. However, it is preferable to apply the same scrambling sequence for the same transmitter-receiver pair.

The resource mapper 810 may perform subcarrier resource mapping so that the fading effect is evenly distributed among subcarriers constituting a SQAM symbol. Specifically, the transmitter may perform subcarrier resource mapping so that individual subcarriers experience similar fading effects. For example, when subcarrier resource mapping is carried out in units of resource length 4, subcarrier resources may be mapped on a time-frequency grid as shown by reference numeral 872 or 874. Here, the resource length may be set so as to correspond to M.

The DFT unit 812 may apply discrete Fourier transform to the signal mapped to transmission resources. The IFFT unit 814 may apply inverse fast Fourier transform to the signal. The CP adder 816 may add a CP to the processed signal, which may be sent to the receiver through the channel 820.

The receiver may include at least one of a synchronization and CP remover 852, an FFT unit 854, an IDFT unit 856, a resource demapper 858, a descrambler 860, a symbol deinterleaver 861, a correlator 862, an LLR calculator 864, and an M-ary channel decoder 866.

The synchronization and CP remover 852 may perform synchronization and remove a CP from the received signal. The FFT unit 854 may apply fast Fourier transform to the signal without a CP. The IDFT unit 856 may apply inverse discrete Fourier transform to the transformed signal. The P/S converter 858 may combine parallel bit streams into a serial bit stream.

The resource demapper 858 may perform resource-symbol demapping in a manner matching that of the resource mapper 810.

The descrambler 860 may descramble the signal using a sequence corresponding to that of the scrambler 808. Preferably, descrambling may be performed on a subcarrier basis in a manner matching that of the scrambler 808.

The symbol deinterleaver 861 may perform symbol deinterleaving on a SQAM symbol basis in a manner matching that of the symbol interleaver 806.

The correlator 862 may obtain information on the sequence used by the SQAM modulator 804 to extract information contained in the received signal. The correlator 862 may identify information on the sequence and mapping used by the SQAM modulator 804 to extract information on the sequence used by the SQAM modulator 804 from the received signal.

The LLR calculator 864 may calculate the log likelihood ratio on the basis of the received signal.

The M-ary channel decoder 866 may estimate symbols on the basis of the calculated LLR value and received signal.

More specifically, the M-ary channel decoder 866 may estimate at least one of information bits and symbols on the basis of the calculated LLR value.

Figure 9:
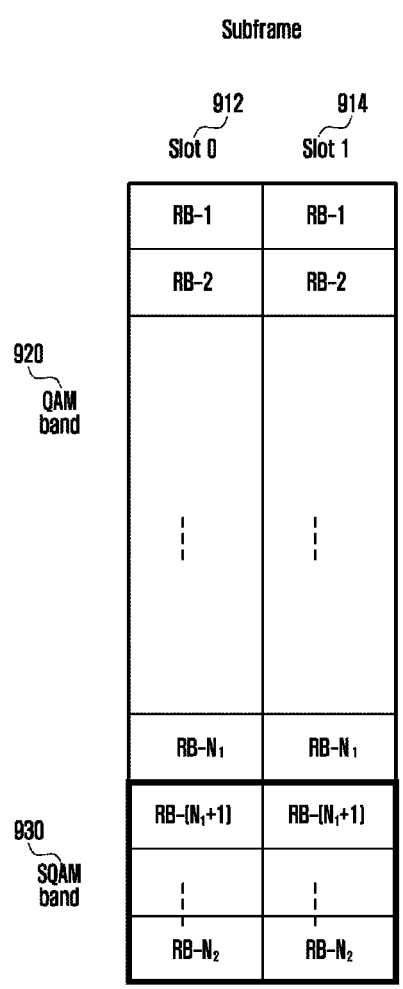
FIG. 9 illustrates a subframe structure for transmission according to an embodiment of the present invention.

FIG. 9 illustrates a subframe structure for transmission according to an embodiment of the present invention.

Referring to FIG. 9, the subframe structure may include slot 0 (912) and slot 0 (912) in the time domain, and may include a QAM band 920 and a SQAM band 930 in the frequency domain. The QAM band 920 may include N1 resource blocks (RBs), and the SQAM band 930 may include N2 RBs. N1 and N2 may be varied according to embodiments, and may be selected in consideration of channel conditions.

In one embodiment, a QAM-modulated signal may be sent through the QAM band 920, and a SQAM-modulated signal may be sent through the SQAM band 930.

Figure 10:
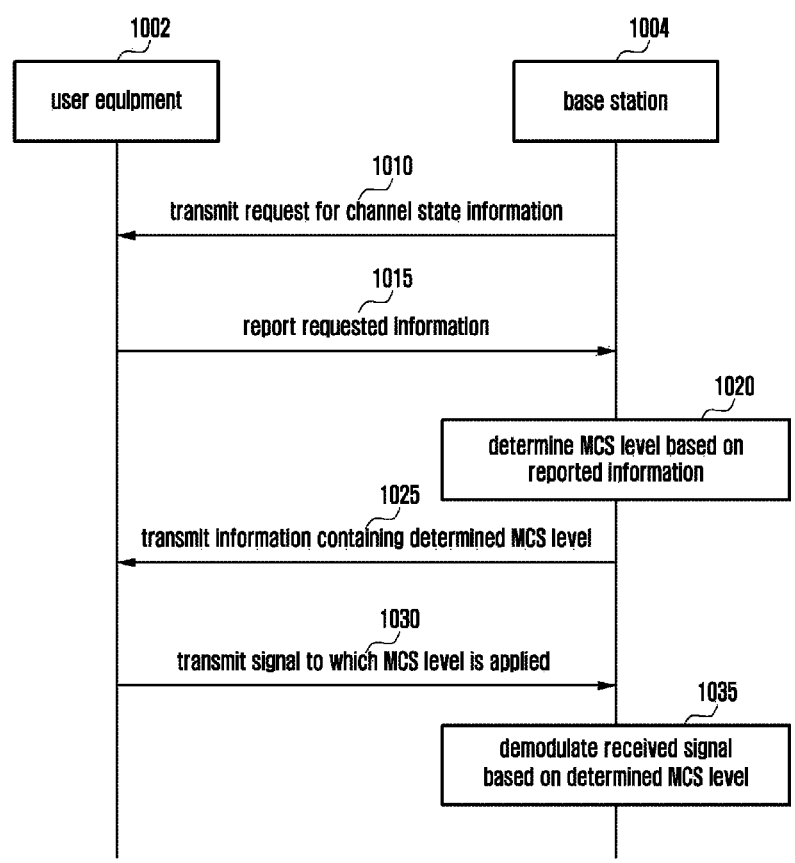
FIG. 10 illustrates signal exchange between a base station and a user equipment using a specific modulation scheme according to an embodiment of the present invention.

FIG. 10 illustrates signal exchange between a base station and a user equipment using a specific modulation scheme according to an embodiment of the present invention.

Referring to FIG. 10, a user equipment 1002 and a base station 1004 may transmit and receive a signal. The modulation scheme for signal transmission and reception may be determined in various ways. However, in the present embodiment, it is assumed that SQAM modulation is used for uplink transmission.

At step 1010, the base station 1004 transmits a request message for channel state information to the user equipment 1002. Although not shown, the base station 1004 may also transmit the user equipment 1002 a reference signal for channel state measurement. In one embodiment, the channel state information may include information on the signal-to-interference-plus-noise ratio (SINR) of a received signal and information on non-Gaussianity of the band used for SQAM signal transmission. The information on non-Gaussianity may include the a value of a CGG PDF or another value indicating how much the additive noise distribution in the corresponding band departs from the Gaussian distribution. The band used for SQAM signal transmission may be set between the user equipment 1002 and the base station 1004, and may be changed according to communication conditions.

At step 1015, the user equipment 1002 transmits a signal containing the requested information to the base station 1004.

At step 1020, the base station 1004 determines the MCS (modulation and coding scheme) level for SQAM on the basis of the received information. In one embodiment, the MCS level may correspond to at least one of the sequence length, QAM level, and code rate for SQAM modulation. The base station 1004 may also determine the MCS level for SQAM on the basis of channel conditions.

The channel state information may include at least one of information on the SINR and information on non-Gaussianity.

At step 1025, the base station 1004 transmits a signal containing MCS level information to the user equipment 1002. In one embodiment, the signal containing MCS level information may further include one or more reference signals.

At step 1030, the user equipment 1002 transmits the base station 1004 a signal that is modulated through SQAM on the basis of the received MCS level information.

At step 1035, the base station 1004 demodulates the received signal on the basis of the determined MCS level.

Figure 11:
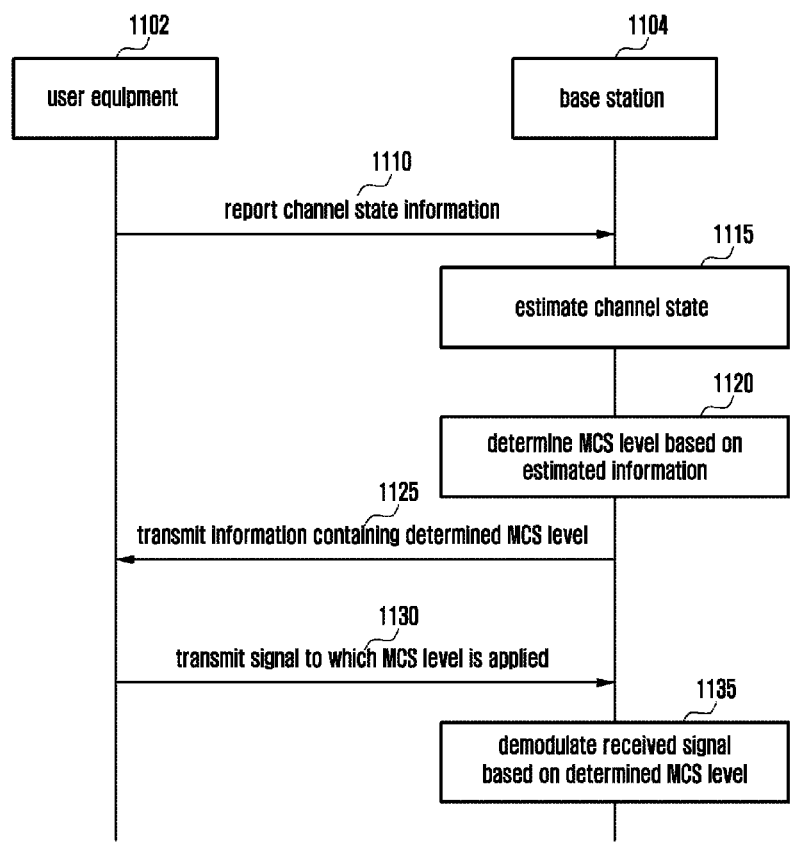
FIG. 11 illustrates signal exchange between a base station and a user equipment using a specific modulation scheme according to another embodiment of the present invention.

FIG. 11 illustrates signal exchange between a base station and a user equipment using a specific modulation scheme according to another embodiment of the present invention.

Referring to FIG. 11, at step 1110, the user equipment 1102 transmits a message containing channel state information to the base station 1104. Although not shown, the base station 1004 may have previously sent the user equipment 1002 a reference signal for channel state measurement. The user equipment 1102 may perform channel measurement on the basis of such a reference signal. In one embodiment, the channel state information may include information on the SINR of a received signal and information on non-Gaussianity of the band used for SQAM signal transmission. The information on non-Gaussianity may include the a value of a CGG PDF or another value indicating how much the additive noise distribution in the corresponding band departs from the Gaussian distribution. The band used for SQAM signal transmission may be set between the user equipment 1102 and the base station 1104, and may be changed according to communication conditions.

At step 1115, the base station 1104 performs channel estimation on the basis of the received information.

At step 1120, the base station 1104 determines the MCS level for SQAM on the basis of the estimated channel information. In one embodiment, the MCS level may correspond to at least one of the sequence length, QAM level, and code rate for SQAM modulation. The base station 1104 may also determine the MCS level for SQAM on the basis of channel conditions. The channel state information may include at least one of information on the SINR and information on non-Gaussianity.

At step 1125, the base station 1104 transmits a signal containing MCS level information to the user equipment 1102. In one embodiment, the signal containing MCS level information may further include one or more reference signals.

At step 1130, the user equipment 1102 transmits the base station 1104 a signal that is modulated through SQAM on the basis of the received MCS level information.

At step 1135, the base station 1104 demodulates the received signal on the basis of the determined MCS level.

Figure 12:
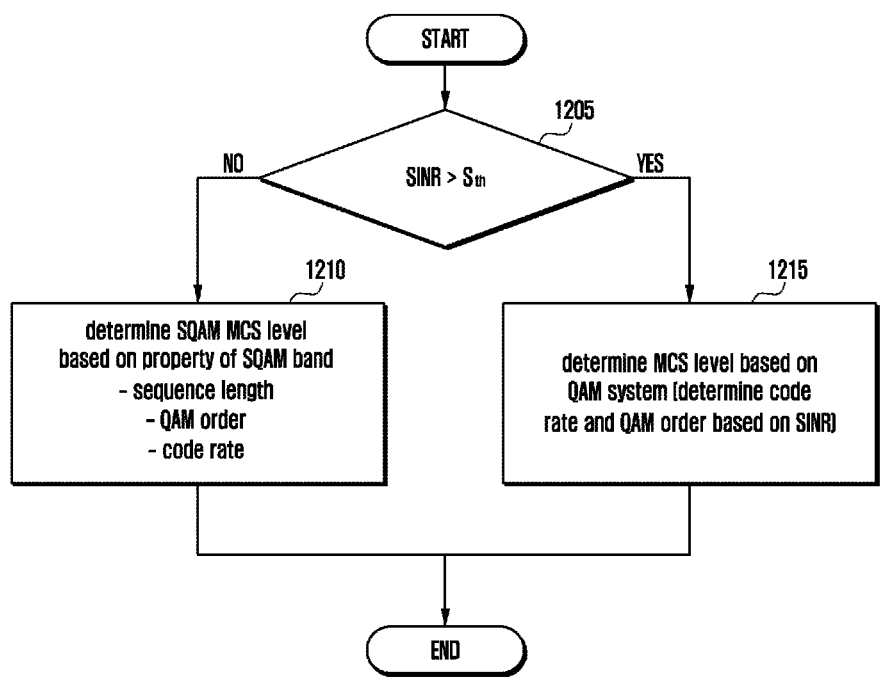
FIG. 12 illustrates modulation scheme determination according to an embodiment of the present invention.

FIG. 12 illustrates modulation scheme determination according to an embodiment of the present invention.

Referring to FIG. 12, at least one of the base station and the user equipment may determine the modulation scheme according to an embodiment. Here, the base station is assumed to determine the MCS level for ease of description. However, the user equipment may directly determine the MCS on the basis of the measured SINR.

At step 1205, the base station compares the SINR received from the user equipment with a preset threshold $S_{th}$. The threshold $S_{th}$ may be determined according to preconfigured settings and may be varied according to communication conditions. Specifically, the threshold $S_{th}$ may be determined on the basis of a reference value triggering repetition in QAM of a given MCS level.

If the SINR is greater than $S_{th}$, at step 1215, the base station may determine the MCS level according to QAM. For example, when $S_{th}$ is set to 3 dB, if SINR>3 dB, modulation may be performed using QPSK with code rate=½.

If the SINR is less than or equal to $S_{th}$, at step 1210, the base station may determine the MCS level for SQAM on the basis of the channel property of the SQAM band. Here, the MCS level for SQAM may be associated with at least one of the sequence length, QAM level/order, and code rate. The channel property of the SQAM band may be associated with non-Gaussianity. The MCS level for a communication system may be optimized through link-level simulation (LLS).

In one embodiment, when the channel property of the SQAM band follows a Gaussian distribution, the sequence length may be increased and the QAM order may be decreased. When the channel property of the SQAM band follows a non-Gaussian distribution, the sequence length may be decreased and the QAM order may be increased. The base station may adjust the MCS level for SQAM by changing either the sequence length or the QAM order according to channel conditions.

In one embodiment, when the SINR value is large, the sequence length may be decreased and the QAM order may be increased. When the SINR value is small, the sequence length may be increased and the QAM order may be decreased.

As described above, the base station can determine the MCS level for QAM or SQAM.

Figure 13:
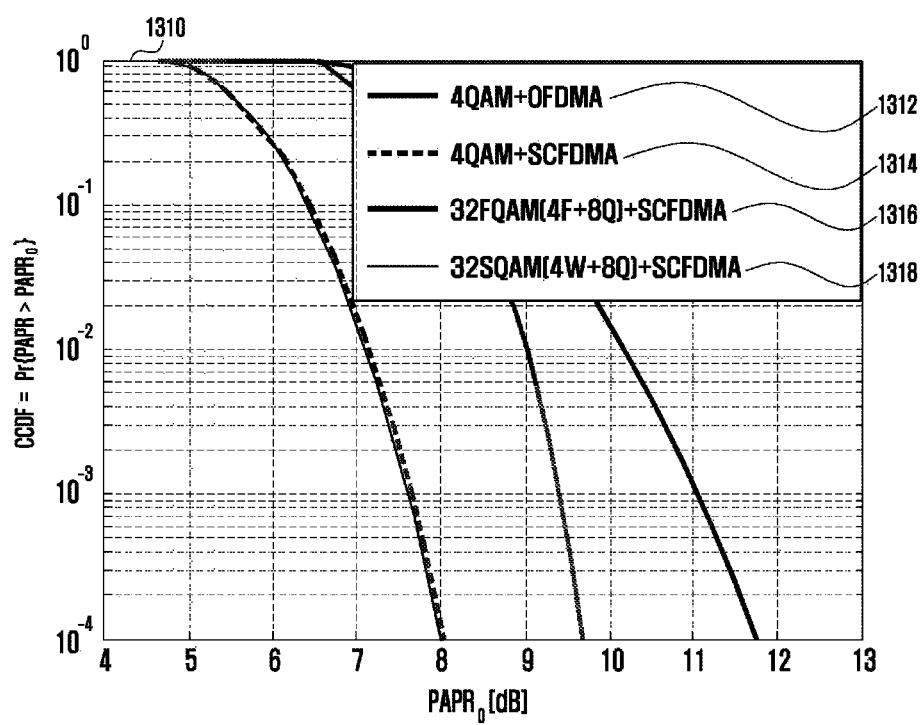
FIG. 13 illustrates PAPR distributions according to another embodiment of the present invention.

FIG. 13 illustrates PAPR distributions according to another embodiment of the present invention.

In FIG. 13, reference numeral 1312 indicates a graph of the PAPR distribution when 4-QAM is used in the OFDMA system. Reference numeral 1314 indicates a graph of the PAPR distribution when 4-QAM is used in the SC-FDMA system. It can be seen that, in the case of 4-QAM, the PAPR is lower for the SC-FDMA system in comparison to the OFDMA system.

Reference numeral 1316 indicates a graph of the PAPR distribution when 32-FQAM (4-FSK+8-QAM) is used in the SC-FDMA system. Reference numeral 1318 indicates a graph of the PAPR distribution when 32-SQAM (4-WSM+8-QAM) is used in the SC-FDMA system. It can be seen that, in the SC-FDMA system, the severity of the high-PAPR problem is lower for 32-SQAM compared to 32-FQAM. In one embodiment, it is possible to have a better PAPR distribution by separately adjusting the WSM level and the QAM level.

Figure 14:
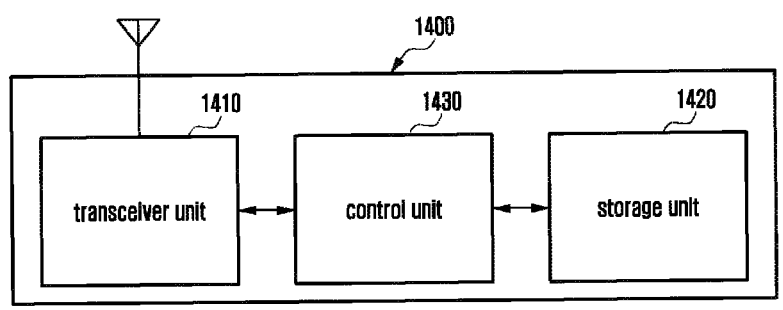
FIG. 14 is a block diagram of a transmitter according to an embodiment of the present invention.

FIG. 14 is a block diagram of a transmitter according to an embodiment of the present invention.

Referring to FIG. 14, the transmitter 1400 of the present invention may include at least one of a transceiver unit 1410, a storage unit 1420, and a control unit 1430.

The transceiver unit 1410 may transmit and receive a signal. The transmitter 1400 may exchange information with a receiver by means of signals sent and received through the transceiver unit 1410. The transceiver unit 1410 may include a wireless or wired communication part.

The storage unit 1420 may store information necessary for operation of the transmitter 1400. The storage unit 1420 may store at least one of information sent and received through the transceiver unit 1410 and information processed by the control unit 1430.

The control unit 1430 may control the overall operation of the transmitter 1400. Specifically, the control unit 1430 may process information necessary for operation of the transmitter 1400 in connection with various embodiments. In particular, the control unit 1430 may perform at least one of encoding information bits, SQAM modulation, symbol interleaving, scrambling on a subcarrier basis, resource mapping, DFT, IFFT, and CP addition.

Figure 15:
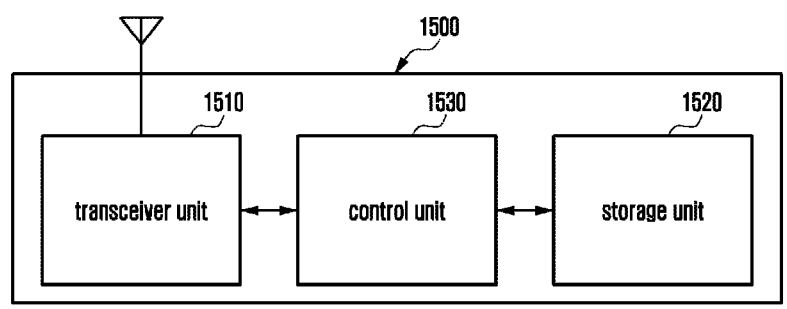
FIG. 15 is a block diagram of a receiver according to an embodiment of the present invention.

FIG. 15 is a block diagram of a receiver according to an embodiment of the present invention.

Referring to FIG. 15, the receiver 1500 of the present invention may include at least one of a transceiver unit 1510, a storage unit 1520, and a control unit 1530.

The transceiver unit 1510 may transmit and receive a signal. The receiver 1500 may exchange information with a transmitter by means of signals sent and received through the transceiver unit 1510. The transceiver unit 1510 may include a wireless or wired communication part.

The storage unit 1520 may store information necessary for operation of the receiver 1500. The storage unit 1520 may store at least one of information sent and received through the transceiver unit 1510 and information processed by the control unit 1530.

The control unit 1530 may control the overall operation of the receiver 1500. Specifically, the control unit 1530 may process information necessary for operation of the receiver 1500 in connection with various embodiments. In particular, the control unit 1530 may perform at least one of decoding information bits, SQAM demodulation, LLR computation, sequence correlation, symbol deinterleaving, descrambling on a subcarrier basis, resource demapping, IDFT, FFT, and CP removal.

In a feature of the present invention, there is provided a modulation method that causes the additive noise distribution to be non-Gaussian in a mobile communication system. Hence, it is possible to significantly increase system throughput. In addition, there are provided a modulation method and apparatus that avoid the high-PAPR problem during signal transmission and reception based on SC-FDMA.

Hereinabove, exemplary embodiments of the present invention have been described with reference to the accompanying drawings. Specific terms or words used in the description should be construed in accordance with the spirit of the present invention without limiting the subject matter thereof. It should be understood that many variations and modifications of the basic inventive concept described herein will still fall within the spirit and scope of the present invention as defined in the appended claims and their equivalents.

What is claimed is:

1. A method of signal transmission for a transmitter device in a mobile communication system, the method comprising:
    identifying a modulation scheme for data transmission;
    identifying a level for quadrature amplitude modulation (QAM) based on the identified modulation scheme;
    identifying a amplitude and phase of a carrier wave based on the QAM level and data to be transmitted; and
    identifying, when the identified modulation scheme is a first scheme, a length of sequences based on channel information, selecting a sequence according to the data to be transmitted among sequences of the identified length, and generating modulated symbols corresponding to the data to be transmitted based on the selected sequence, the amplitude of the carrier wave and the phase of the carrier wave.

2. The method of claim 1, further comprising modulating, if the identified modulation scheme is a second scheme, the data to be transmitted based on the amplitude of the carrier wave and phase of the carrier wave.

3. The method of claim 1, further comprising receiving information related to the signal-to-interference-plus-noise ratio (SINR) of a channel from a receiver device, and wherein the identifying of the modulation scheme comprises identifying QAM as the modulation scheme if the SINR is greater than or equal to a threshold value.

4. The method of claim 1, further comprising:
    interleaving the modulated symbols; and
    scrambling the modulated symbols on a subcarrier basis to generate scrambled subcarriers.

5. The method of claim 4, further comprising:
    identifying fading effect of the scrambled subcarriers; and
    mapping transmission resources of the subcarriers such that fading effect of the subcarriers corresponds to each other.

6. A method of signal reception for a receiver device in a mobile communication system, the method comprising:
    receiving, from a transmitter device, a signal;
    identifying the modulation scheme of the received signal;
    identifying a sequence corresponding to the received signal from a sequence set used to modulate the received signal based on the modulation scheme and a correlator associated with the sequence set, wherein a length of the sequence set is associated with channel information between the receiver device and the transmitter device; and
    demodulating the received signal based on the identified sequence and the log likelihood ratio (LLR) corresponding to the received signal.

7. The method of claim 6, further comprising:
    identifying the interleaving scheme applied to the received signal; and
    deinterleaveing the received signal based on the interleaving scheme.

8. The method of claim 6, further comprising:
    identifying the scrambling scheme on a subcarrier basis applied to the received signal; and
    descrambling the received signal on a subcarrier based on the scrambling scheme.

9. A transmitter device in a mobile communication system, comprising:
    a transceiver configured to transmit and to receive a signal; and
    at least one processor configured to:
        control the transceiver,
        identify a modulation scheme for data transmission,
        identify a level for quadrature amplitude modulation (QAM) based on the identified modulation scheme,
        identify an amplitude and phase of a carrier wave based on the QAM level and data to be transmitted, and
        identify, when the identified modulation scheme is a first scheme, a length of sequences based on channel information, selecting a sequence according to the data to be transmitted among sequences of the identified length, and generate modulated symbols corresponding to the data to be transmitted based on the selected sequence, the amplitude of the carrier wave and the phase of the carrier wave.

10. The transmitter device of claim 9, wherein the at least one processor is further configured to modulate, if the identified modulation scheme is a second scheme, the data to be transmitted based on the amplitude of the carrier wave and phase of the carrier wave.

11. The transmitter device of claim 9,
    wherein the at least one processor is further configured to receive information related to the signal-to-interference-plus-noise ratio (SINR) of a channel from a receiver device, and
    wherein the identifying of the modulation scheme comprises identifying QAM as the modulation scheme if the SINR is greater than or equal to a threshold value.

12. The transmitter device of claim 9, wherein the at least one processor is further configured to:
    interleave the modulated symbols, and
    scramble the modulated symbols on a subcarrier basis to generate scrambled subcarriers.

13. The transmitter device of claim 12, wherein the at least one processor is further configured to:
- identify fading effect of the scrambled subcarriers, and
- map transmission resources of the subcarriers such that fading effect of the subcarriers corresponds to each other.

14. A receiver device in a mobile communication system, comprising:
- a transceiver configured to transmit and receive a signal; and
- at least one processor configured to:
  - control the transceiver to receive, from a transmitter device, a signal,
  - identify the modulation scheme of the received signal,
  - identify a sequence corresponding to the received signal from a sequence set used to modulate the received signal based on the modulation scheme and a correlator associated with the sequence set, wherein a length of the sequence set is associated with channel information between the receiver device and the transmitter device, and
  - demodulate the received signal based on the identified sequence and the log likelihood ratio (LLR) corresponding to the received signal.

15. The receiver device of claim 14, wherein the at least one processor is further configured to:
- identify the interleaving scheme applied to the received signal, and
- deinterleave the received signal based on the interleaving scheme.

16. The receiver device of claim 14, wherein the at least one processor is further configured to:
- identify the scrambling scheme on a subcarrier basis applied to the received signal, and
- descramble the received signal on a subcarrier based on the scrambling scheme.

\* \* \* \* \*